United States Patent [19]

Vazquez

[11] Patent Number: 5,018,413

[45] Date of Patent: May 28, 1991

[54] TOOL SUPPORT

[76] Inventor: Francisco S. Vazquez, 800 NW. 13th Ave., Apt. 1411, Miami, Fla. 33125

[21] Appl. No.: 475,948

[22] Filed: Feb. 6, 1990

[51] Int. Cl.⁵ .............................................. B25B 23/00
[52] U.S. Cl. ................................... 87/462; 0.87/180.1
[58] Field of Search .......................... 87/52, 180.1, 462

[56] References Cited

U.S. PATENT DOCUMENTS 4,620,462  11/1986  Parker ..................................... 87/462

FOREIGN PATENT DOCUMENTS 2338457   2/1975   Fed. Rep. of Germany ........ 87/462
2733183   2/1979   Fed. Rep. of Germany ........ 87/462
1536907  12/1978   United Kingdom .................. 87/462

Primary Examiner—James G. Smith
Attorney, Agent, or Firm—Malloy, Downey & Malloy

[57] ABSTRACT

For use in removing and replacing a vehicle wheel normally secured to the vehicle by lug nuts, wherein the tool is of the commonly encountered cruciform with four radially extending arms carrying distal sockets, a tool support composed of a base and a standard with a plurality of generally cylindrical receiving chambers along the standard in closely spaced relation.

1 Claim, 1 Drawing Sheet

TOOL SUPPORT

BACKGROUND OF THE INVENTION

Field of the Invention

This invention relates to a tool support and more particularly to a tool support for use in removing lugs from the wheel of a vehicle as is explained more fully hereinafter.

Elderly persons and handicapped people, among others, have difficulty in removing lugs from vehicle wheels when removing or replacing the wheel when there has been a flat tire. This invention is a tool to assist persons in manipulating the tool.

SUMMARY OF THE INVENTION

This invention is of a tool which includes a standard supported On a base which is adapted to be positioned in confronting relation to a wheel of a vehicle wherein there is a plurality of receiving chambers along the standard so that when a cruciform type of tool is utilized, and the conventional distal socket of the tool is positioned about one of the lugs, the socket on the oppositely extending arm is received in a receiving chamber along the standard, so that one is not required to use one hand to hold the extending arm. Once in position, the tool can be turned by foot pressure.

OBJECT OF THE INVENTION

It is an object of this invention to provide a tool of the type described which is simple and inexpensive to manufacture, highly portable, and readily useable to assist in removing lugs from a wheel of a vehicle.

BRIEF DESCRIPTION OF THE DRAWINGS

For a fuller understanding of the nature of the present invention, reference should be had to the following description taken in connection with the accompanying drawings in which.

DETAILED DESCRIPTION OF THE PREFERRED EMBODIMENT

Figure 1:
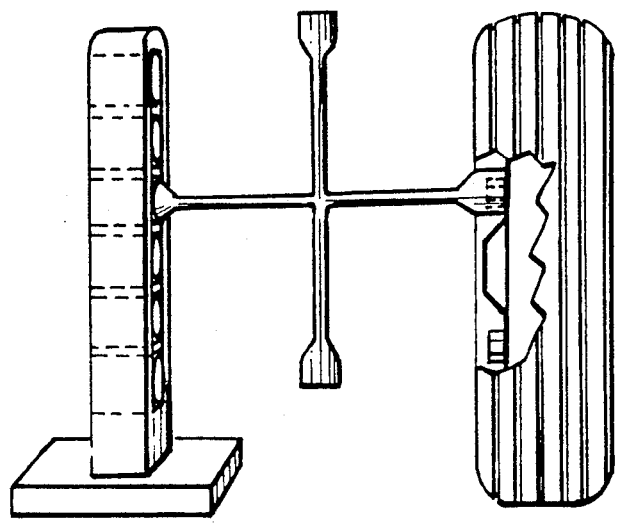
FIG. 1 is a perspective view of the tool support shown in use with a cruciform when removing a lug nut from a tire.
Figure 2:
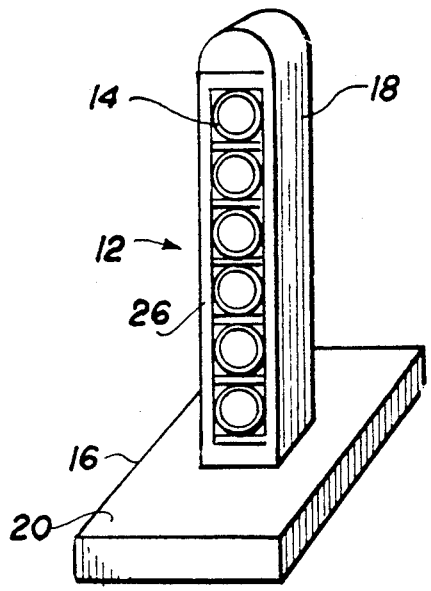
FIG. 2 is a perspective view of the preferred embodiment of the present invention when fully assembled.
Figure 3:
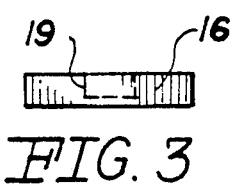
FIG. 3 is a side view of the base of the tool support.
Figure 4:
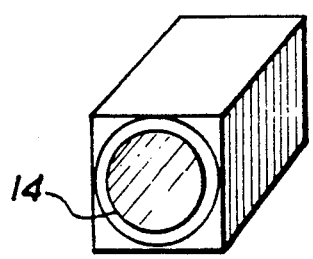
FIG. 4 is a perspective view of a receiving chamber.
Figure 5:
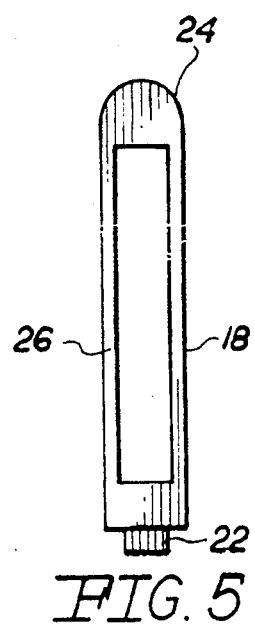
FIG. 5 is a side view of the standard shown with the receiving chambers removed.

In the drawings, it is seen that the tool support of the present invention generally designated by the numeral 12 is adapted to be positioned with a plurality of receiving chambers such as 14 in confronting relation to the wheel of a vehicle. This is so that the plurality of lug nuts commonly utilized to hold a wheel on the vehicle may be removed using a cruciform lug removing tool which includes four radially extending arms carrying distal sockets. The tool support 12 it is seen includes a base 16 and a standard 18. The base 16 has an upper surface 20 and a centrally arranged recess 19 in the upper surface of a first predetermined size. The standard 18 has the lower end zone 22 and an upper end 24 and an upwardly extending vertical face 26 :n which the receiving chambers 14 are arranged in close adjacent spaced relation. The lower end zone of the standard is sized and configured to fit within the recess 19 with the upwardly extending portion in a vertical orientation. The plurality of receiving chambers are generally cylindrical and each is adapted to receive any one of the sockets of the tool.

In use, the support is positioned in confronting relation to the wheel of a vehicle and once a lug nut has been received in one of the sockets, the socket on the oppositely extending arm is positioned in the receiving chamber at about the same height as the lug nut being removed. Thereafter, the tool may be manipulated using two hands or the feet to apply pressure.

Preferably, the tool support is of metal and the base is about eighteen square inches in area while the height of the standard is about seventeen inches and the receiving chambers are preferably two inches deep and of a diameter of at least one and one half inches.

While this invention has been shown and described in the practical and preferred manner, it is recognized that the departures may be made within the scope of this invention which is therefore not to be limited except as set forth in the claims hereinafter and in accordance with the doctrine of equivalents.

What is claimed is:

1. For use in removing and replacing a vehicle wheel normally secured to the vehicle by a plurality of spaced lug nuts, using a cruciform lug removal tool including four radially extending arms each carrying a distal socket, a tool supporting comprising:

a base having a support surface and an upper surface and a centrally arranged cylindrical recess in the upper surface of a first predetermined size and configuration, a standard having a peg shaped lower end and a main upstanding extending portion with a working vertical surface, said standard being sized and configured for receipt of the peg shaped lower end in the recess with the upstanding extending portion in rigid vertical orientation, said standard having a substantially elongate receiving slot structured and configured for adaptive receipt of a plurality of cylindrical receiving chambers in a vertically stacked orientation, a plurality of cylindrical receiving chambers in the working vertical surface along the upstanding extending portion in closely spaced relation, each of said receiving chambers being sized to receive any one of the sockets when the tool support is placed in confronting relation to the wheel and assembled, with two of the arms of the cruciform lug removal tool extending in aligned relation with one of the receiving chambers so that on rotation of the cruciform lug removal took, the receiving chamber serves as a bearing means.

* * * * *